(12) United States Patent  (10) Patent No.: US 8,347,993 B2
Ishida  (45) Date of Patent: Jan. 8, 2013

(54) MOTORCYCLE

(75) Inventor: Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 628 days.

(21) Appl. No.: 11/946,719

(22) Filed: Nov. 28, 2007

(65) Prior Publication Data

US 2008/0121455 A1  May 29, 2008

(30) Foreign Application Priority Data

Nov. 29, 2006  (JP) ................................. 2006-322066
Jan. 26, 2007  (JP) ................................. 2007-016494

(51) Int. Cl.
*B60K 11/06* (2006.01)

(52) U.S. Cl. ..................................... 180/68.1

(58) Field of Classification Search ................. 180/68.1, 180/219, 229, 230
See application file for complete search history.

(56) References Cited

U.S. PATENT DOCUMENTS

| | | | | |
|---|---|---|---|---|
| 4,495,773 | A * | 1/1985 | Inoue et al. ................... | 60/605.1 |
| 4,531,606 | A * | 7/1985 | Watanabe ...................... | 180/210 |
| 4,531,928 | A * | 7/1985 | Ikenoya .......................... | 474/93 |
| 4,671,781 | A * | 6/1987 | Tanaka et al. ................... | 474/93 |
| 4,697,665 | A * | 10/1987 | Eastman et al. ............... | 180/230 |
| 4,712,629 | A | 12/1987 | Takahashi et al. | |
| 6,544,134 | B2 * | 4/2003 | Ohyama et al. ............... | 474/144 |
| 6,651,769 | B2 * | 11/2003 | Laivins et al. ................. | 180/229 |
| 6,786,290 | B2 | 9/2004 | Kuji et al. | |
| 6,820,708 | B2 | 11/2004 | Nakamura | |
| 6,941,206 | B2 * | 9/2005 | Hasegawa et al. ............... | 701/38 |
| 7,281,596 | B2 * | 10/2007 | Fukuda ......................... | 180/68.2 |
| 7,316,626 | B2 | 1/2008 | Oishi et al. | |
| 7,347,296 | B2 * | 3/2008 | Nakamura et al. ........... | 180/68.1 |
| 7,487,853 | B2 * | 2/2009 | Ishida et al. ................... | 180/219 |
| 7,537,077 | B2 * | 5/2009 | Nakashima et al. .......... | 180/229 |
| 7,686,123 | B2 * | 3/2010 | Ishida ............................ | 180/346 |
| 8,157,038 | B2 * | 4/2012 | Ishida et al. .................. | 180/68.1 |
| 2002/0108795 | A1 | 8/2002 | Kuji et al. | |
| 2003/0066696 | A1 | 4/2003 | Nakamura | |
| 2004/0171449 | A1 | 9/2004 | Oishi et al. | |

(Continued)

FOREIGN PATENT DOCUMENTS

EP  0952075 A2  10/1999

(Continued)

OTHER PUBLICATIONS

European search report for corresponding European application 07254520.5.

(Continued)

*Primary Examiner* — Tashiana Adams
*Assistant Examiner* — Daniel Yeagley
(74) *Attorney, Agent, or Firm* — Rabin & Berdo, P.C.

(57) ABSTRACT

An off-road vehicle having a belt type continuously variable transmission and an air intake path. A four cycle type engine includes a crank case and a cylinder extending upward from the crank case. A belt type continuously variable transmission is provided on one end of the crank case in a vehicle width direction. A belt chamber is formed inside a transmission case for housing the belt type continuously variable transmission. A part of the transmission case in front of a rear end of the cylinder is connected to an intake path for leading air to the belt chamber. The intake path extends upward from the transmission case.

15 Claims, 10 Drawing Sheets

U.S. PATENT DOCUMENTS

| | | |
|---|---|---|
| 2005/0085329 A1 | 4/2005 | Kawakubo et al. |
| 2006/0000652 A1* | 1/2006 | Yamaguchi et al. ......... 180/68.3 |
| 2006/0090942 A1 | 5/2006 | Hastings |
| 2006/0213478 A1 | 9/2006 | Tawarada et al. |
| 2007/0023217 A1* | 2/2007 | Ishida et al. .................. 180/219 |
| 2009/0090576 A1* | 4/2009 | Nishizawa et al. ........... 180/219 |
| 2009/0218152 A1* | 9/2009 | Oohashi et al. .............. 180/68.3 |

FOREIGN PATENT DOCUMENTS

| | | |
|---|---|---|
| EP | 1433645 A1 | 6/2004 |
| EP | 1433645 A2 | 6/2004 |
| EP | 1619419 A1 | 1/2006 |
| EP | 1707852 A1 | 10/2006 |
| EP | 1712463 A1 | 10/2006 |
| JP | 61-040864 | 9/1986 |
| JP | 03099992 A * | 4/1991 |
| JP | 05069872 A * | 3/1993 |
| JP | 05319343 A * | 12/1993 |
| JP | 06-057547 | 8/1994 |
| JP | 10141054 A * | 5/1998 |
| JP | 10299873 A * | 11/1998 |
| JP | 11011170 A * | 1/1999 |
| JP | 11011171 A | 1/1999 |

OTHER PUBLICATIONS

Partial European Search Report for corresponding European application 07254520.

* cited by examiner

US 8,347,993 B2

MOTORCYCLE

RELATED APPLICATIONS

This application claims the benefit of priority under 35 USC 119 of Japanese patent application no. 2006-322066, filed on Nov. 29, 2006, and Japanese patent application no. 2007-016494, filed on Jan. 26, 2007, which applications are hereby incorporated by reference in their entireties.

BACKGROUND OF THE INVENTION

1. Field of the Invention

The invention relates to a motorcycle comprising a belt type continuously variable transmission.

2. Description of Related Art

A motorcycle comprising a belt type continuously variable transmission (CVT) is known (refer to JP-B-61-40864 and JP-B-6-57547, for example). The CVT comprises a V-belt wound around a primary and a secondary sheave. Heat is generated due to friction between the V-belt and the sheaves in operation of the CVT. Accordingly, it is preferable to provide an intake path to supply the CVT with air for cooling.

JP-B-61-40864 discloses a power unit comprising a two cycle type engine, a CVT and an intake path for cooling the transmission at a position lower than an upper end of a crank case of the engine. JP-B-6-57547 discloses a power unit comprising a two cycle type engine, a CVT and an intake path for cooling the transmission extending to a position higher than the crank case.

Providing a CVT on an off-road vehicle would be advantageous since it would make the troublesome clutch operation unnecessary. However, because there are problems in applying the structures of JP-B-61-40864 and JP-B-6-57547 to off-road vehicles, a CVT including an intake path for cooling has not yet been applied to an off-road vehicle.

When an intake path is provided at a position lower than the upper end of the crank case, as in JP-B-61-40864, water and dust can easily rise from the ground to enter into the intake path. Therefore, the structure of JP-B-61-40864 is problematic for off-road vehicles that often run on unpaved roads and the like.

Further, in an off-road vehicle, a cylinder of the engine rises up and an angle between the cylinder and a horizontal line is large. Moreover, because the minimum height of a power unit from the ground should be comparatively high, the cylinder and exhaust pipe are provided above the crank case. The exhaust pipe and cylinder are thereby obstructive to extending the intake path to a position higher than the crank case, as in JP-B-6-57547.

For these reasons, it has been difficult to mount a CVT with an air intake path to an off-road vehicle or motorcycle using conventional technology.

SUMMARY OF THE INVENTION

The invention provides an off-road vehicle or motorcycle having a CVT and an air intake path.

A motorcycle in accordance with the invention comprises a four stroke type engine including a cylinder extending upward or obliquely upward to a front side from a crank case. A belt type continuously variable transmission (CVT) is provided on one end of the crank case in a vehicle width direction. A transmission case covers at least a part of the CVT and has a belt chamber formed therein for housing the CVT. An intake path for leading air to the belt chamber includes at least a part extending upward or obliquely upward to the front side from a part of the transmission case in front of a rear end of the cylinder.

Another motorcycle in accordance with the invention comprises a four cycle type engine including a cylinder extending upward from a crank case. A belt type continuously variable transmission (CVT) is provided on one end of the crank case in a vehicle width direction. A transmission case covers at least a part of the CVT and has a belt chamber formed therein for housing the CVT. An intake path for leading air to the belt chamber extends upward from the transmission case. An exhaust pipe is connected to the cylinder and crosses with the intake path above the transmission case.

In accordance with the invention, an off-road vehicle or motorcycle having a belt type CVT and a preferable intake path is provided.

Other features and advantages of the invention will be apparent from the following detailed description, taken in conjunction with the accompanying drawings which illustrate, by way of example, various features of embodiments of the invention.

DETAILED DESCRIPTION OF THE INVENTION

The inventor has found, as a result of diligent effort, that applying a four cycle type engine instead of a two cycle type engine allows the exhaust pipe to be thinned, and that extending an intake path for cooling a belt type continuously variable transmission (CVT) upward from the transmission case allows the intake path to be compactly provided in a surplus space created above the crank case by thinning the exhaust pipe, and thus has conceived the invention. Embodiments of the invention are now described.

<Embodiment 1>

<<Outline of Embodiment 1>>

Figure 1:
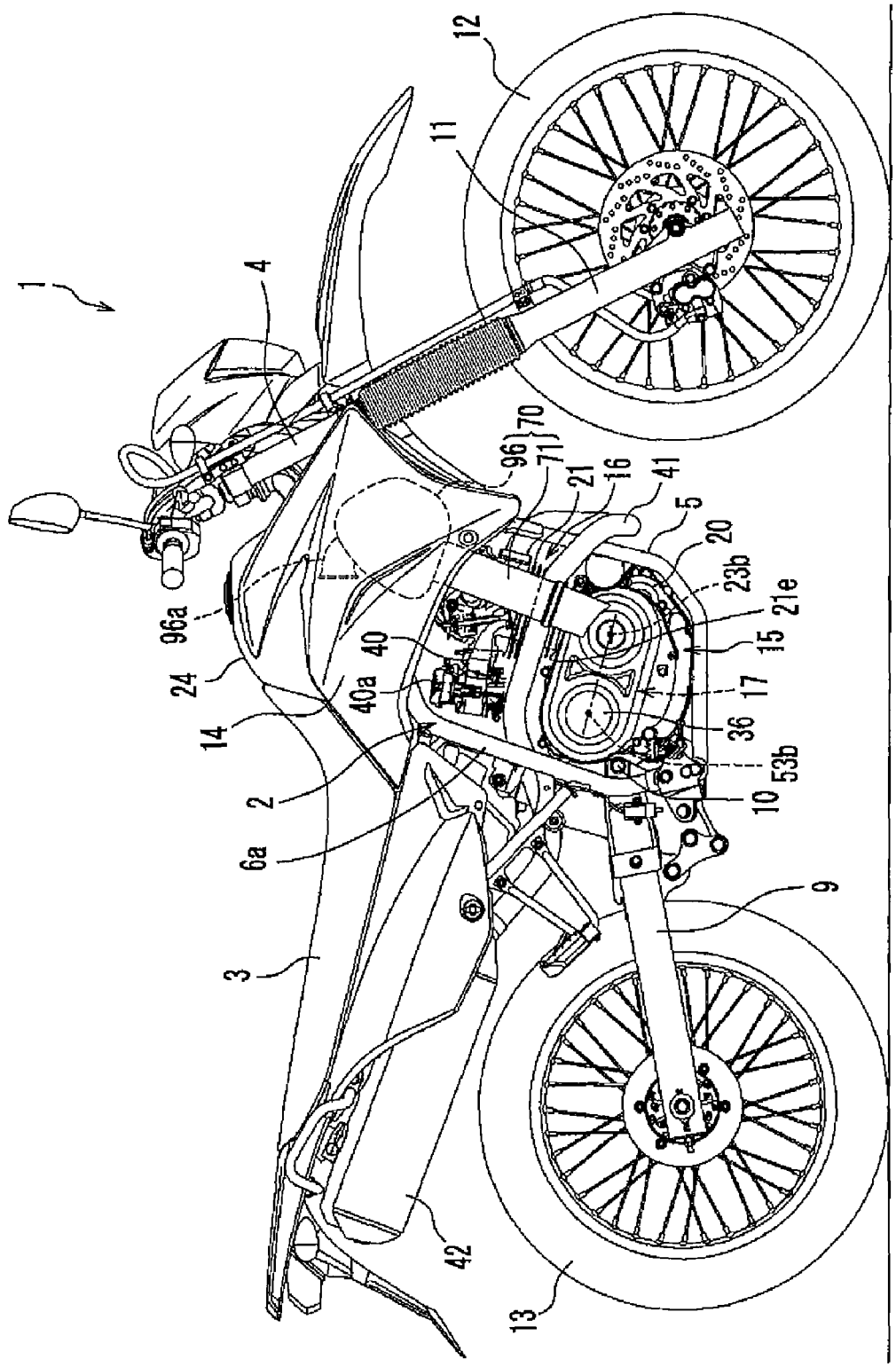
FIG. 1 is a side view of a motorcycle in accordance with a first embodiment of the invention.
Figure 2:
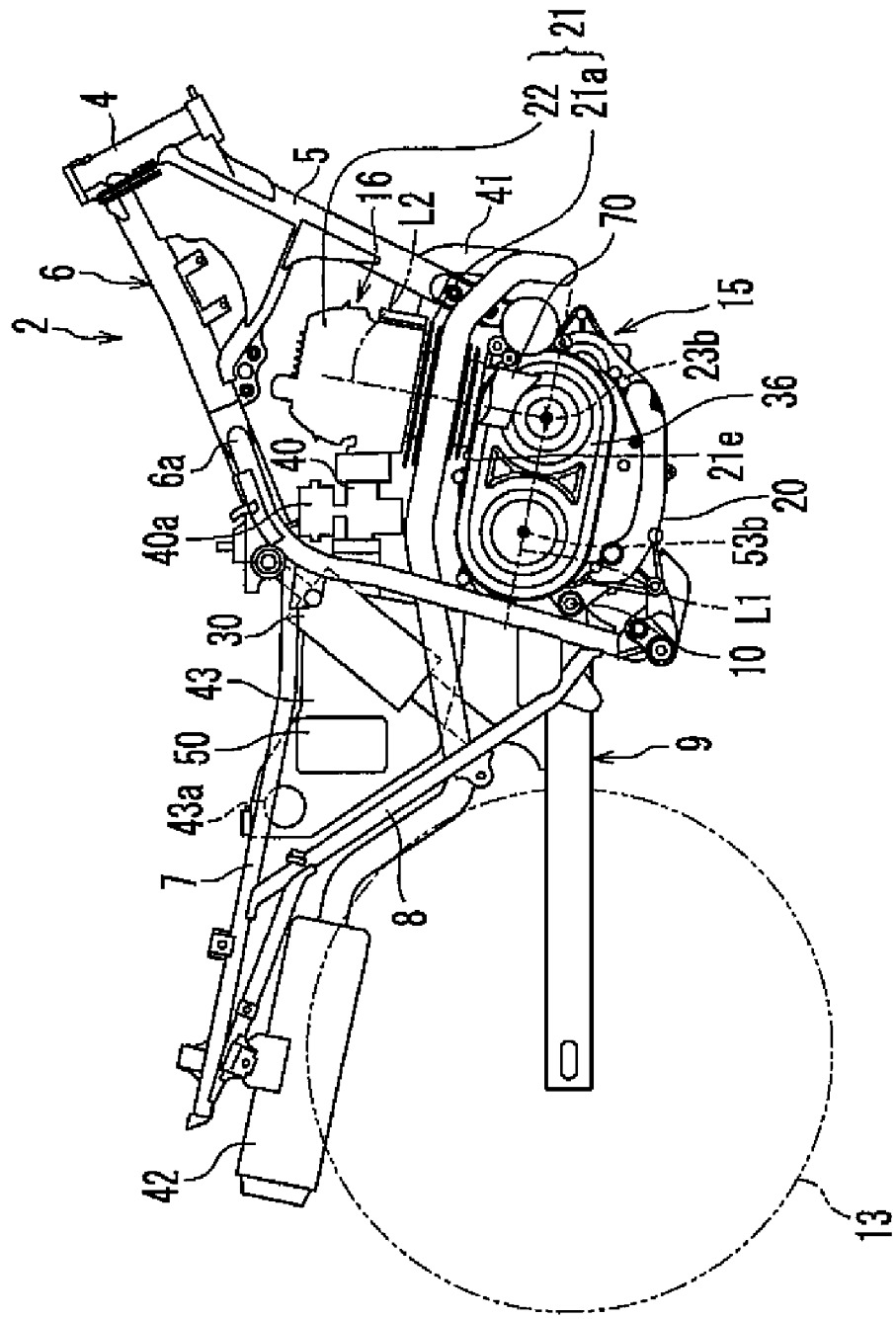
FIG. 2 is a side view of a part of the motorcycle of FIG. 1.
Figure 3:
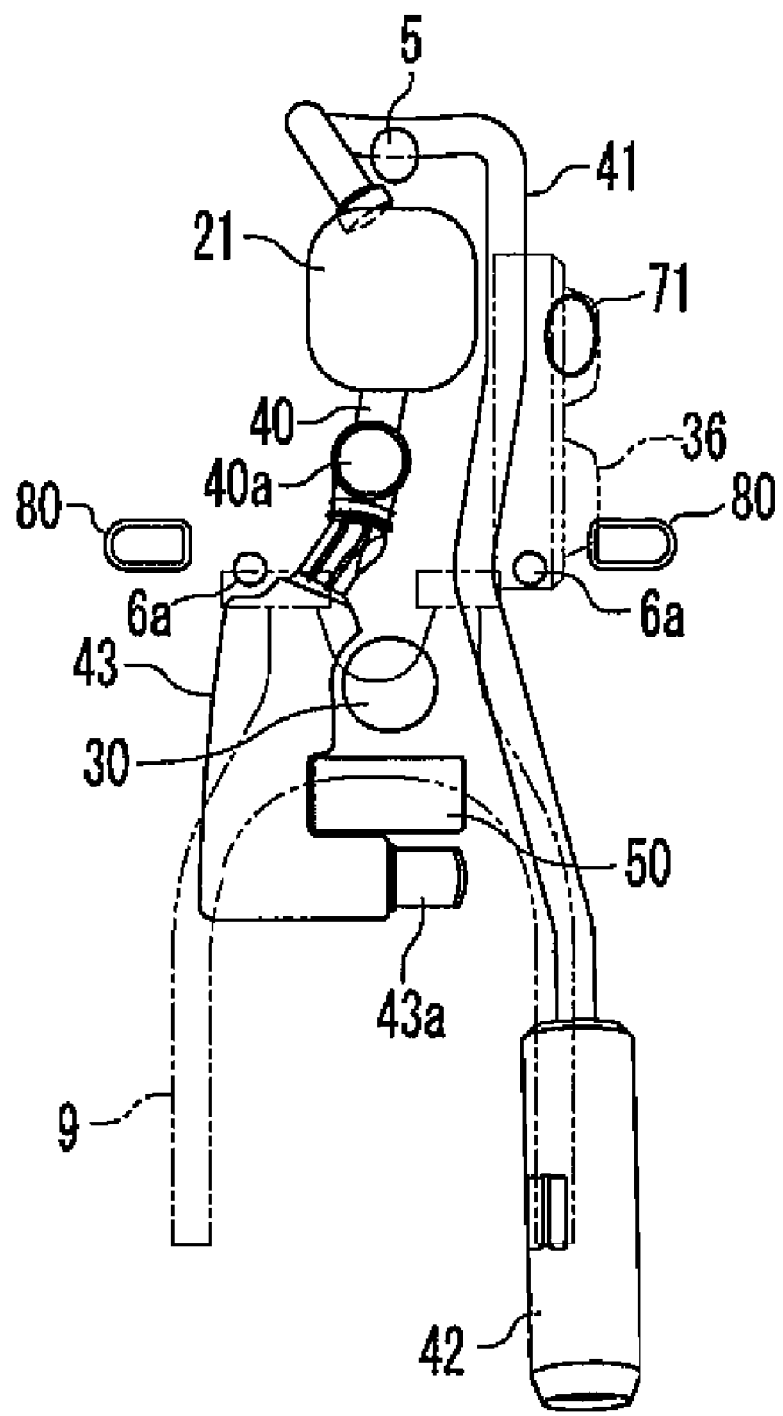
FIG. 3 is a flat view of a part of the motorcycle of FIG. 1.

As shown in FIGS. 1-3, a motorcycle 1 in accordance with a first embodiment of the invention includes an intake path 70 for cooling a belt type continuously variable transmission (CVT) 17 extends on an outer side of an exhaust pipe 41 in a vehicle width direction to an upper side.

<<Whole Structure of Motorcycle>>

Motorcycle 1 is a so-called off-road type motorcycle comprising a body frame 2, a fuel tank 24 supported on body frame 2 and a seat 3 supported on body frame 2 and provided behind fuel tank 24.

In the following description, back-and-forth and lateral directions are from the perspective of a rider sitting on seat 3.

Further, "extending to the upper side" means extending upward as a whole or at least partly upward. It is not limited to extending vertically but includes extending obliquely upward. Similarly, "rearward" is not limited to a rear direction along a strictly back-and-forth direction but also includes a rear direction that also inclines perpendicularly or laterally to the back-and-forth direction. That is, "rearward" includes obliquely rearward.

As shown in FIG. 2, body frame 2 includes a down tube 5 extending downward from a head pipe 4, and a main tube 6 extending rearward from head pipe 4 above down tube 5. A pair of right and left seat pillars 6a is divided downward from a middle part of main tube 6. A seat rail 7 extending rearward is connected to seat pillar 6a. A middle part of seat rail 7 is connected to a rear end of a backstay 8. A front end of backstay 8 is connected to a lower end of seat pillar 6a.

A front fork 11 is inserted into head pipe 4. A front wheel 12 is supported on a lower end of front fork 11. A front end of a rear arm 9 is supported by a pivot shaft 10 to be freely swingable. A rear wheel 13 is supported on a rear end of rear arm 9.

A power unit 15 comprising an engine 16 and a belt type CVT 17 is supported on body frame 2. Engine 16 comprises a crank case 20 and a cylinder 21 extending upward (more particularly, obliquely upward to the front side) from crank case 20. Cylinder 21 includes a cylinder body 21a and a cylinder head 22, as shown in FIG. 2. Cylinder head 22 is considered as included in cylinder 21 in this description.

Cylinder 21 rises from crank case 20 and inclines slightly forward with respect to the vertical direction. In other words, cylinder 21 inclines substantially with respect to a horizontal line. CVT 17 comprises a primary sheave shaft 23a and a secondary sheave shaft 53. A line L1 connecting an axial core 23b of primary sheave shaft 23a and an axial core 53b of secondary sheave shaft 53 crosses at substantially a right angle with a center line L2 of cylinder 21 in side view. Axial core 53b of secondary sheave shaft 53 is provided at a position higher than axial core 23b of primary sheave shaft 23a.

An intake pipe 40 is connected on the rear side of cylinder 21 and is provided with a carburetor 40a. A rear end of intake pipe 40 is connected to an air chamber 43.

An exhaust pipe 41 projects forward from a front side of cylinder 21 to curve or bend toward the rear side and extends above transmission case 36 or crank case 20 to the rear side (see FIG. 3). In a side view, exhaust pipe 41 crosses with intake path 70 above transmission case 36. A rear end of exhaust pipe 41 is connected to a muffler 42.

Figure 6:
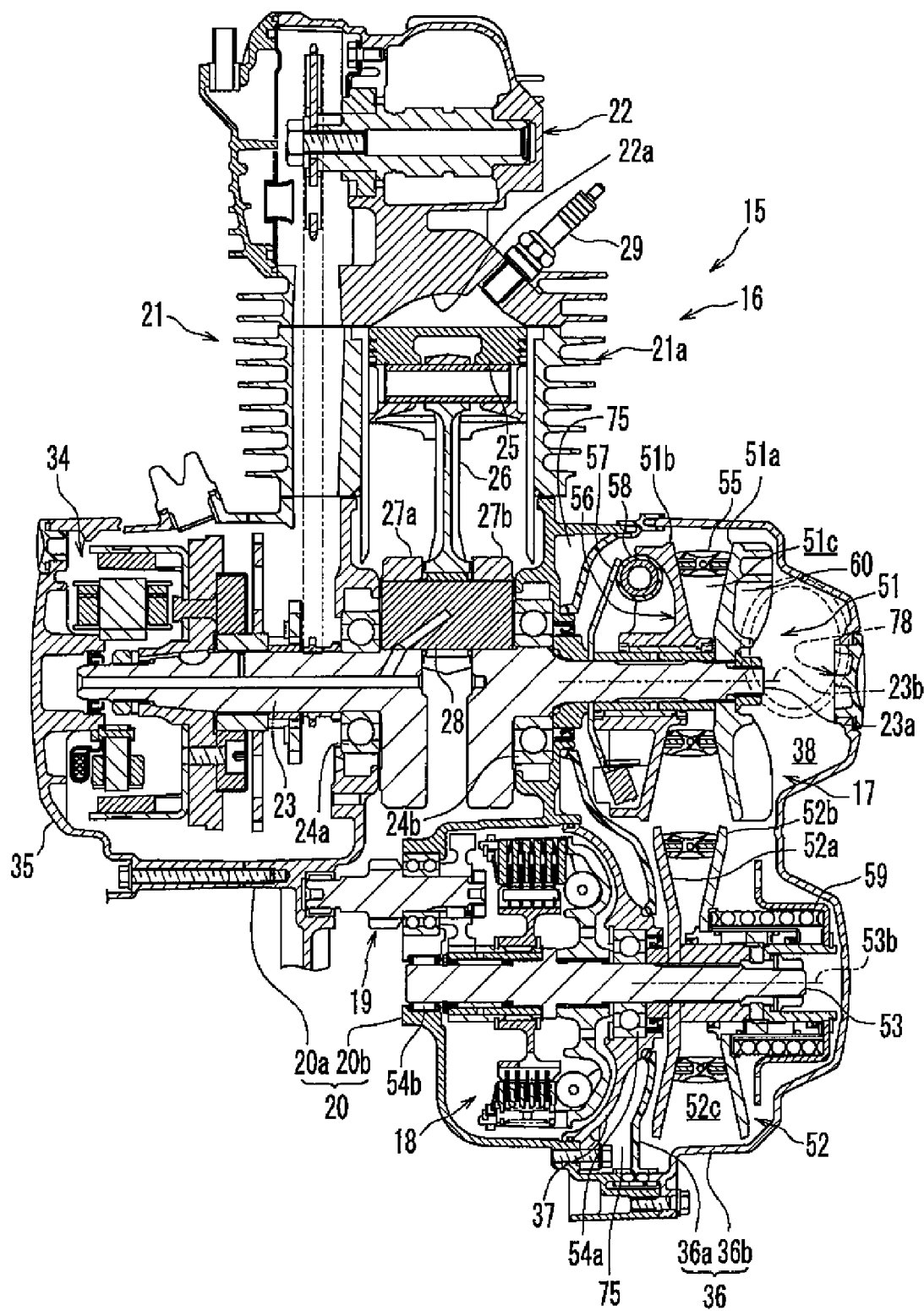
FIG. 6 is a sectional view of a power unit of the motorcycle of FIG. 1.

A belt chamber 38 housing CVT 17 is formed inside transmission case 36 (FIG. 6). As shown in FIG. 1, an intake path 70 for supplying belt chamber 38 with cooling air is connected in front of a center of transmission case 36 in the back-and-forth direction. Intake path 70 extends obliquely upward to the front side from a part of transmission case 36 located in front of a rear end 21e of cylinder 21, in side view. Intake path 70 comprises an intake duct 71 extending obliquely upward to the front side from transmission case 36 and an air box 96 connected to an upper end of intake duct 71. Air box 96 and intake duct 71 may be formed as one body or separate bodies. Moreover, air box 96 is not necessarily provided, and intake path 70 may be formed only from intake duct 71.

Figure 4:
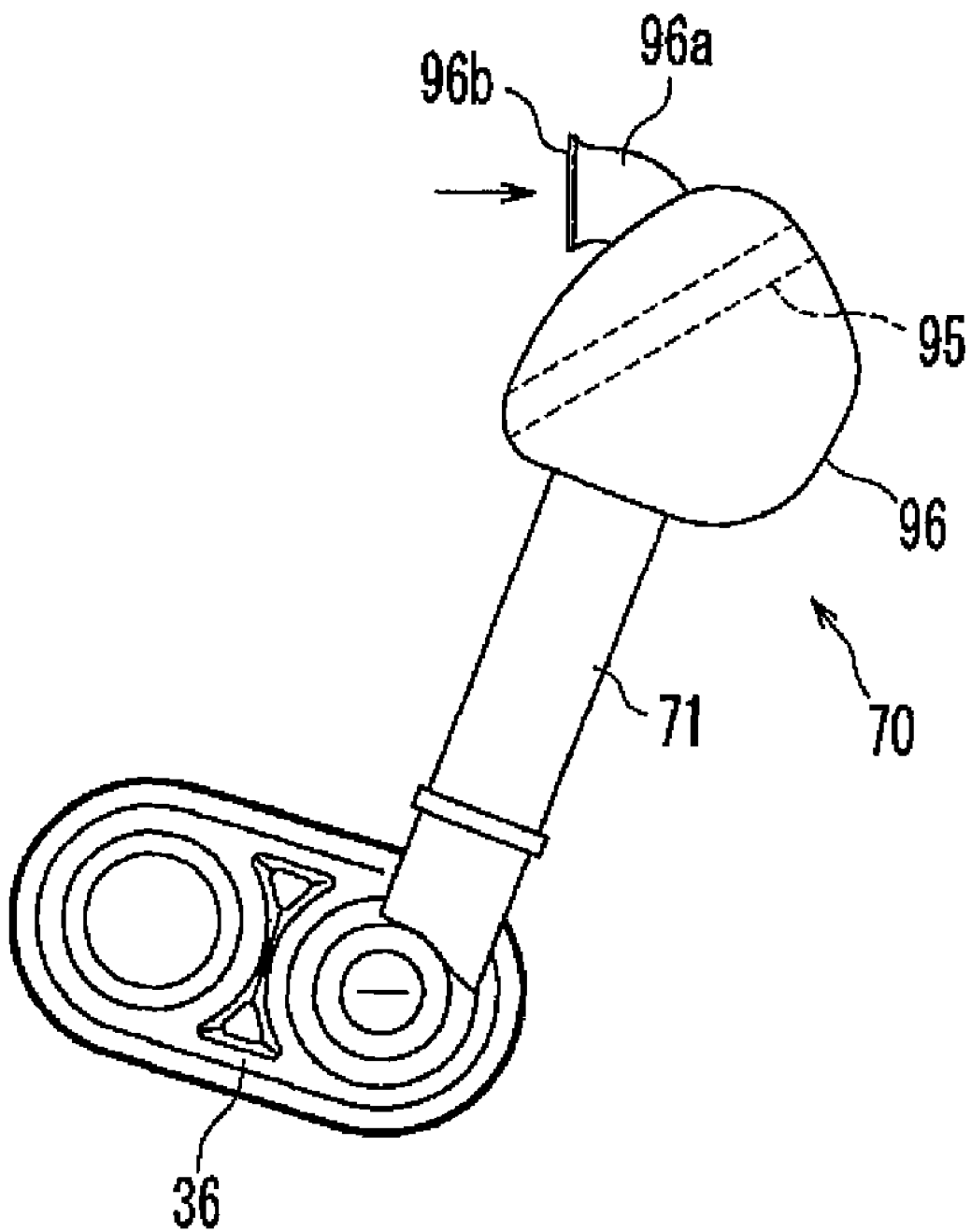
FIG. 4 is a side view of an intake path of the motorcycle of FIG. 1.

Air box 96 is an air path forming member in the shape of a box. Substantially no pulse of air is generated differently in intake path 70 from intake pipe 40 of engine 16. Accordingly, air box 96 may not necessarily be a so-called air chamber for temporarily storing air, and may have a meander flow channel formed inside thereof, for example. Air box 96 may be an air chamber, of course. As shown in FIG. 4, an air filter 95 is formed inside air box 96. An intake pipe 96a is connected on an upper and rear side of air box 96. An intake opening 96b opening rearward is formed in intake pipe 96a.

Figure 5:
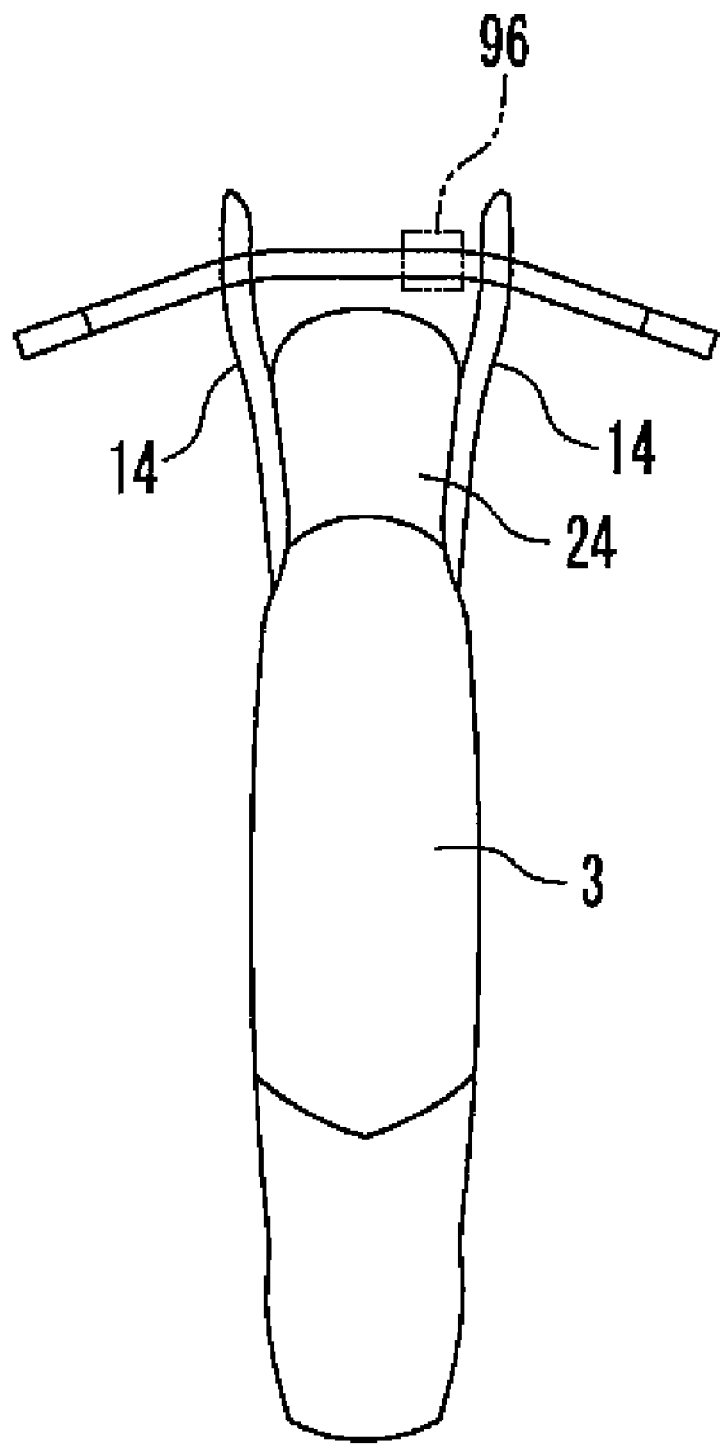
FIG. 5 is a plan view of a fuel tank, a cover and the like of the motorcycle of FIG. 1.

Right and left covers 14 are provided on sides of fuel tank 24 and widen toward the front side, as shown in FIG. 5. Air box 96 and intake pipe 96a are provided on inner sides of covers 14. Thus, air box 96 and intake pipe 96a are covered by covers 14 in side view. A part of intake path 70 extends to and is provided on the inner sides of covers 14.

Exhaust pipe 41 and intake duct 71 are provided on the right side of cylinder 21, as shown in FIG. 3. Intake duct 71 is adjacent to cylinder 21 in the vehicle width direction. Intake duct 71 and cylinder 21 overlap in side view (refer to FIG. 1). Exhaust pipe 41 extends rearward between cylinder 21 and intake duct 71.

As shown in FIG. 3, a rear cushion unit 30 is provided at the center part in the vehicle width direction. Rear cushion unit 30 is provided between and connects main tube 6 and rear arm 9, as shown in FIG. 2. Motorcycle 1 includes only one rear cushion unit 30 and has a so-called mono-suspension structure. Rear cushion unit 30 is not limited to a direct connection to rear arm 9 and may instead be connected to rear arm 9 through a link.

A battery 50 is provided behind rear cushion unit 30 and on the right side of air chamber 43, and underneath seat 3. As shown in FIG. 3, air chamber 43 is connected to intake pipe 43a opening rightward, and a footstep 80 is provided.

<<Inner Structure of Power Unit>>

An inner structure of power unit 15 is described with reference to FIGS. 6-8. Power unit 15 comprises engine 16, CVT 17, a centrifugal clutch 18 and a reduction mechanism 19. Engine 16 is a four cycle type engine repeating the four cycles of an intake process, a compression process, a combustion process and an exhaust process. In the first embodiment, engine 16 is a four cycle single cylinder engine.

Engine 16 comprises cylinder body 21a connected to crank case 20 and cylinder head 22 connected on the upper side of cylinder body 21a. Cylinder body 21a and cylinder head 22 form cylinder 21, as described before. Crank case 20 includes two divided case blocks, namely, a first case block 20a located on the left side and a second case block 20b located on the right side. First case block 20a and second case block 20b face each other in the vehicle width direction. A crank shaft 23 extending horizontally in the vehicle width direction is housed in crank case 20 and supported on first case block 20a through a bearing 24a and on second case block 20b through bearing 24b.

A piston 25 is slidably inserted into cylinder 21. One end of a connecting rod 26 is connected to piston 25. The other end of connecting rod 26 is connected to a crank pin 28 provided between a left crank arm 27a and a right crank arm 27b of crank shaft 23.

A concave 22a is formed in cylinder head 22. Intake and exhaust ports communicate with concave 22a. An ignition plug 29 is inserted into cylinder head 22. The intake port is connected to intake pipe 40 and the exhaust port is connected to exhaust pipe 41.

A generator case 35 housing a generator 34 is mounted to the left side of a front half of first case block 20a. A transmission case 36 housing CVT 17 is mounted to the right side of second case block 20b. An opening covered by a clutch cover 37 is formed on the right side of a rear half of second case block 20b.

Transmission case 36 is formed independently from crank case 20 from an inner case 36a covering the inner (left) side of CVT 17 in the vehicle width direction and an outer case 36b covering the outer (right) side of CVT 17 in the vehicle width direction. Inner case 36*a* is mounted on the right side of crank case 20. Outer case 36*b* is mounted on the right side of inner case 36*a*. Belt chamber 38 housing CVT 17 is formed inside inner case 36*a* and outer case 36*b*. An intake opening 78 connected to intake duct 71 is formed on an upper surface of outer case 36*b*.

A right end of crank shaft 23 passes through second case block 20*b* and inner case 36*a* to extend to belt chamber 38. A primary sheave 51 of CVT 17 is fitted in the right end of crank shaft 23. Primary sheave 51 rotates in accordance with rotation of crank shaft 23. A right part of crank shaft 23 (a part on the right side of bearing 24*b*) forms primary sheave shaft 23*a*. A left end of crank shaft 23 passes through first case block 20*a* to extend to the inner side of generation case 35. Generator 34 is mounted to the left end of crank shaft 23.

Secondary sheave shaft 53 on which a secondary sheave 52 is fitted is provided in a rear half of crank case 20 in parallel to crank shaft 23. A part on the right side of a center part of secondary sheave shaft 53 is supported on clutch cover 37 through a bearing 54*a*. A part on the left side of secondary sheave shaft 53 is supported on a left end of second case block 20*b* through a bearing 54*b*. Secondary sheave 52 is connected to a right end of secondary sheave shaft 53.

CVT 17 comprises a V-belt 55 wound around primary sheave 51 and secondary sheave 52. Primary sheave 51 comprises a fixed sheave body 51*a* located on the outer side in the vehicle width direction and a movable sheave body 51*b* located on the inner side in the vehicle width direction and facing fixed sheave body 51*a*. Fixed sheave body 51*a* is fixed to a right part of primary sheave shaft 23*a* and rotates with primary sheave shaft 23*a*. Movable sheave body 51*b* is provided on the left side of fixed sheave body 51*a* and is mounted to primary sheave shaft 23*a* so as to be freely slidable. Accordingly, movable sheave body 51*b* rotates with primary sheave shaft 23*a* and is freely slidable in an axial direction of primary sheave shaft 23*a*. A belt groove 51*c* is formed between fixed sheave body 51*a* and movable sheave body 51*b*. A cam surface 56 is formed in a part of the left side of movable sheave body 51*b*. A cam plate 57 is provided on the left side of cam surface 56. A roller weight 58 is provided between cam surface 56 and cam plate 57.

Secondary sheave 52 comprises a fixed sheave body 52*a* located on the inner side in the vehicle width direction and a movable sheave body 52*b* located on the outer side in the vehicle width direction and facing fixed sheave body 52*a*. Movable sheave body 52*b* is fixed to a right part of secondary sheave shaft 53. Movable sheave body 52*b* rotates with secondary sheave shaft 53 and is freely slidable in an axial direction of secondary sheave shaft 53. A compressing coil spring 59 is provided on the right side of secondary sheave 52. Movable sheave body 52*b* receives a leftward urging force from spring 59. An axial core part of fixed sheave body 52*a* is a cylindrical slide collar spline-fitted on secondary sheave shaft 53. A V-shaped belt groove 52*c* is formed between fixed sheave body 52*a* and movable sheave body 52*b*.

V-belt 55 is a so-called resin block belt comprising plural resin blocks and a connection body for connecting the resin blocks.

Plural vanes 60 are formed for ventilation on the right side of fixed sheave body 51*a* of primary sheave 51. Intake opening 78 formed on the upper surface of transmission case 36 is connected to intake duct 71. Intake opening 78 is formed in a front half of transmission case 36 (above primary sheave 51). Accordingly, intake duct 71 is connected in front of a rear end of primary sheave 51.

When fixed sheave body 51*a* rotates with primary sheave shaft 23*a*, air is led into belt chamber 38 through intake opening 78 by means of vanes 60 while air in belt chamber 38 is exhausted to the outside. In the first embodiment, vanes 60 extend spirally outward in the diameter direction from the center part of fixed sheave body 51*a* in side view. However, the shape and number of vanes 60 is not limited. It may be possible to provide a vaned wheel or the like formed separately from and on the outer side of fixed sheave body 51*a*.

Figure 7:
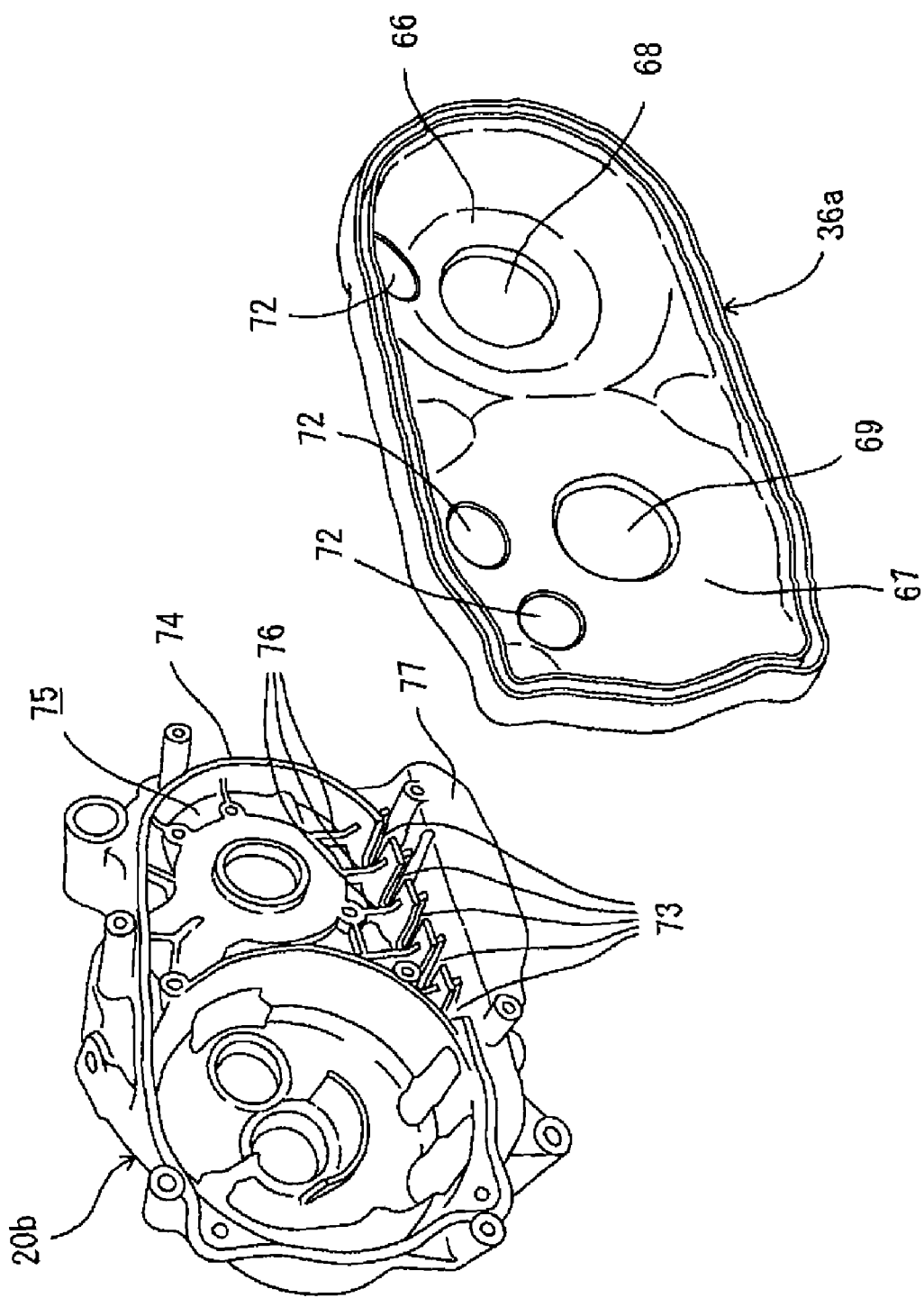
FIG. 7 is an exploded perspective view of a second case block and an inner case of the motorcycle of FIG. 1.

FIG. 7 is a perspective view of second case block 20*b* and inner case 36*a*. A front half 66 of inner case 36*a* is formed into the shape of a bowl projecting leftward while a rear half 67 of inner case 36*a* is formed into the shape of a bowl projecting rightward. A hole 68 into which primary sheave shaft 23*a* is inserted is formed in front half 66. A hole 69 into which secondary sheave shaft 53 is inserted is formed in rear half 67. Clutch cover 37 which exists between inner case 36*a* and second case block 20*b* is omitted from FIG. 7.

Vents 72 are provided in inner case 36*a*. In one embodiment, there are three circular vents 72 on an upper side of inner case 36*a*. However, the shape and number of vents 72 are hot limited.

Plural vents 73 are formed in a lower part of a right part of second case block 20*b*. Second case block 20*b* includes a peripheral part 74 rising up rightward and having a shape corresponding to an outline of transmission case 36. A lower part of peripheral part 74 is formed into the shape of a slit or notched to form a comb shape. A space 75 sectioned by second case block 20*b* and inner case 36*a* communicates with the outside of power unit 15 through vents 73. Space 75 is formed between clutch cover 37 and inner case 36*a* in a rear half of second case block 20*b* since the right side of the rear half of second case block 20*b* is covered with clutch cover 37 (FIG. 6).

Reinforcement ribs 76 are provided in the comb-shaped part of peripheral part 74. An oil pan 77 is provided under vents 73. In accordance with such a structure, the air in belt chamber 38 is led to space 75 through vents 72 of inner case 36*a* to be exhausted toward oil pan 77 through vents 73 of second case block 20*b*. As a result, air is exhausted to the outside of power unit 15.

Figure 8:
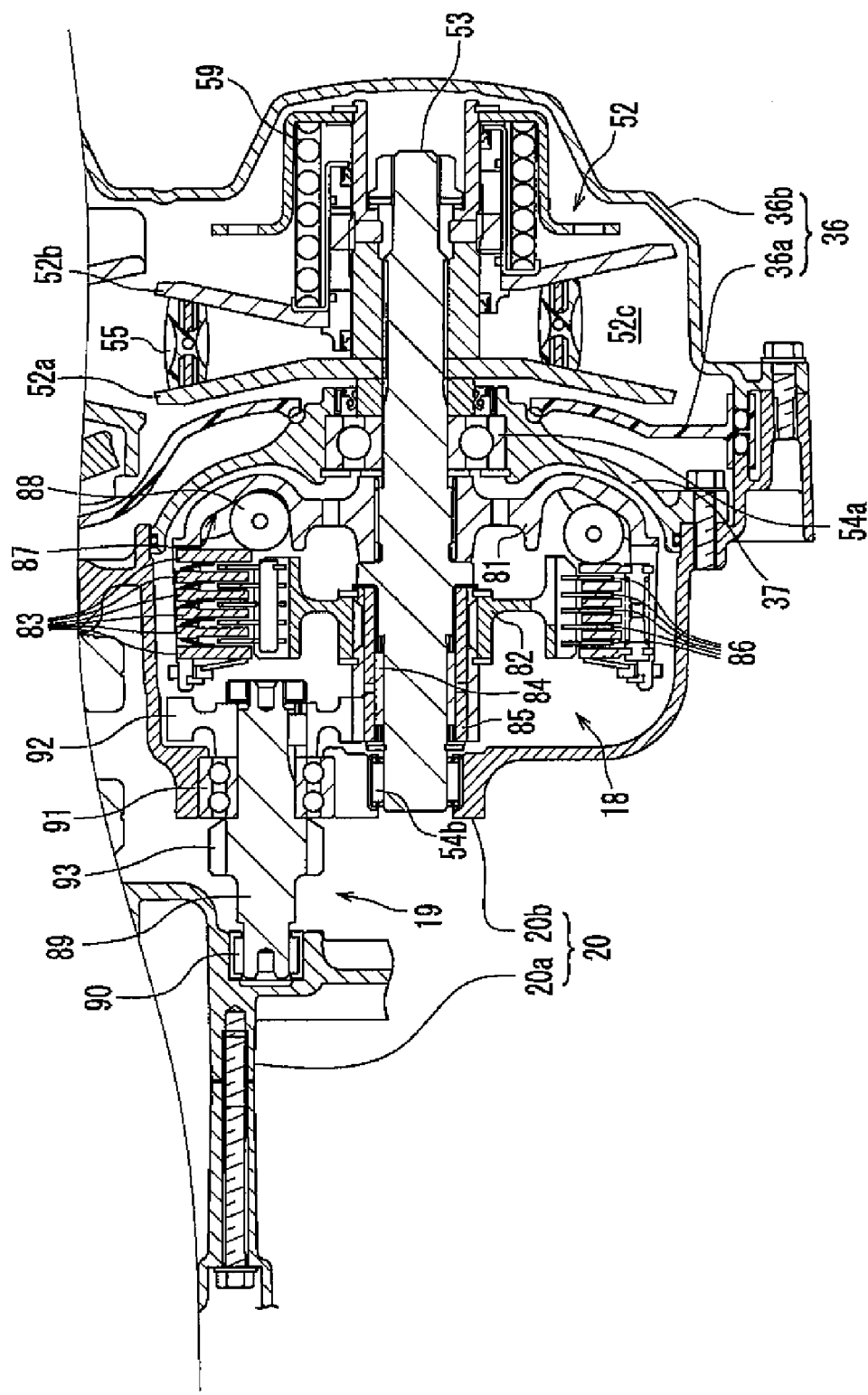
FIG. 8 is an enlarged sectional view of a part of the power unit showing a periphery of a centrifugal clutch.

As shown in FIG. 8, centrifugal clutch 18 is mounted to a left part of secondary sheave shaft 53. Centrifugal clutch 18 is a wet type multi-plate clutch and comprises a substantially cylindrical clutch housing 81 and a clutch boss 82. Clutch housing 81 is spline-fitted on secondary sheave shaft 53 to rotate with secondary sheave shaft 53. A plural number of ring-shaped clutch plates 83 are mounted to clutch housing 81.

A cylindrical gear 85 is fitted through a bearing 84 in the periphery of the left part of secondary sheave shaft 53 so as to be freely rotatable. Clutch boss 82 is provided on the inner side in the diameter direction of clutch plate 83 and on the outer side in the diameter direction of gear 85 to engage with gear 85. This causes gear 85 to rotate together with clutch boss 82. A plural number of ring-shaped friction plates 86 are mounted on the outer side in the diameter direction of clutch boss 82. Friction plates 86 are provided in line at intervals in an axial direction of secondary sheave shaft 53. Friction plates 86 are provided between adjacent clutch plates 83.

Plural cam surfaces 87 are formed on the left side of clutch housing 81, A roller weight 88 is provided between cam surface 87 and the rightmost clutch plate 83 facing cam surface 87.

Centrifugal clutch 18 can be automatically switched between an in-clutch state (a state of connection) and an off-clutch state (a state of disconnection) in accordance with a size of a centrifugal force operating on roller weight 88. In FIG. 8, a part below secondary sheave shaft 53 shows the in-clutch state while a part above secondary sheave shaft 53 shows the out-of-clutch state.

Reduction mechanism 19 is provided between centrifugal clutch 18 and an output shaft. Reduction mechanism 19 includes a transmission shaft 89 provided parallel to secondary sheave shaft 53. Transmission shaft 89 is supported on first case block 20a through a bearing 90 so as to be freely rotatable. Transmission shaft 89 is also supported on second case block 20b through a bearing 91 so as to be freely rotatable. A first transmission gear 92 engaging with gear 85 is provided on a right end of transmission shaft 89.

A second transmission gear 93 having a diameter smaller than that of first transmission gear 92 is provided in a center part of transmission shaft 89. Second transmission gear 93 engages an output shaft or a gear.

Thus, clutch boss 82 and the output shaft are connected through gear 85, first transmission gear 92, transmission shaft 89 and second transmission gear 93. Accordingly, the output shaft rotates in accordance with rotation of clutch boss 82. A power transmission mechanism for transmitting the driving force of the output shaft to rear wheel 13, such as a chain, is wound around the output shaft.

<<Cooling Operation of CVT>>

A cooling operation of CVT 17 is now described. When power unit 15 starts operating, primary sheave shaft 23a rotates and vanes 60 of fixed sheave body 51a of primary sheave 51 rotate in accordance with rotation of primary sheave shaft 23a. This generates a sucking force, which leads air from intake duct 71 toward belt chamber 38.

Air is then sucked into air box 96 through intake opening 96b (refer to FIG. 4) and passes through filter 95 to be purified. After this, the air is sucked into belt chamber 38 through intake duct 71. Air sucked into belt chamber 38 flows in the periphery of and cools primary sheave 51, secondary sheave 52 and V-belt 55.

After having cooled primary sheave 51, secondary sheave 52 and V-belt 55, the air is exhausted from belt chamber 38 through vents 72 of inner case 36a (refer to FIG. 7) to flow into space 75 between inner case 36a and second case block 20b. Air in space 75 is exhausted to the outside of power unit 15 through vents 73 formed in the lower part of second case block 20b. Such air flow continuously and regularly cools CVT 17.

<<Effect of the Embodiment>>

As described above, according to the first embodiment, a four cycle type engine 16 is used while intake path 70 extending upward from a part of transmission case 36 located in front of rear end 21e of cylinder 21 supplies CVT 17 with air for cooling.

Thus, exhaust pipe 41 can be narrowed to secure a surplus space above crank case 20. The surplus space is effectively used for intake path 70 to be provided upward without obstruction by cylinder 21 and exhaust pipe 41. Accordingly, water and dust rising from the ground are effectively prevented from entering intake path 70, in contrast to a configuration where the intake path is at a position lower than the upper end of the crank case. Thus, according to the invention, CVT 17 including intake path 70 can be mounted on an off-road type vehicle.

Further, in accordance with this embodiment, exhaust pipe 41 crosses intake path 70 above transmission case 36 in side view. This also allows intake path 70 to be provided upward without any obstruction by cylinder 21 and exhaust pipe 41, so that the above-mentioned effect can be achieved.

In the first embodiment, intake path 70 preferably extends upward from a part of transmission case 36 in front of rear end 21e of cylinder 21. However, intake path 70 may extend from a part located behind rear end 21e of cylinder 21 so long as exhaust pipe 41 crosses intake path 70 above transmission case 36.

Intake path 70 is preferably adjacent to cylinder 21 in the vehicle width direction, and exhaust pipe 41 extends between cylinder 21 and intake path 70. By providing cylinder 21, exhaust pipe 41 and intake path 70 at a higher density, the size of the vehicle can be reduced.

Moreover, in accordance with this embodiment, a sucking part of intake path 70, namely, intake pipe 96a is provided on an inner side of cover 14. Accordingly, cover 14 effectively prevents mud or the like from entering intake path 70. Further, there is a certain degree of space on the inner side of cover 14 that is effectively used for providing a part of intake path 70 (mainly air box 96), allowing the vehicle to be more compact.

In addition, intake opening 96b of intake pipe 96a is opened rearward in accordance with the first embodiment. Mud and the like are thereby further prevented from entering intake path 70. Further, rainwater is effectively prevented from entering intake path 70. Intake opening 96b preferably faces the inner surface of cover 14 to further prevent mud or the like from entering intake opening 96b.

As described above, in accordance with the first embodiment, air box 96 including air filter 95 is provided on the inner sides of covers 14. This puts a comparatively large space on the inner sides of covers 14 to practical use, and prevents air filter 95, which is a comparatively large component, from projecting to the outside, so that air filter 95 is provided compactly.

<Embodiment 2>

Figure 9:
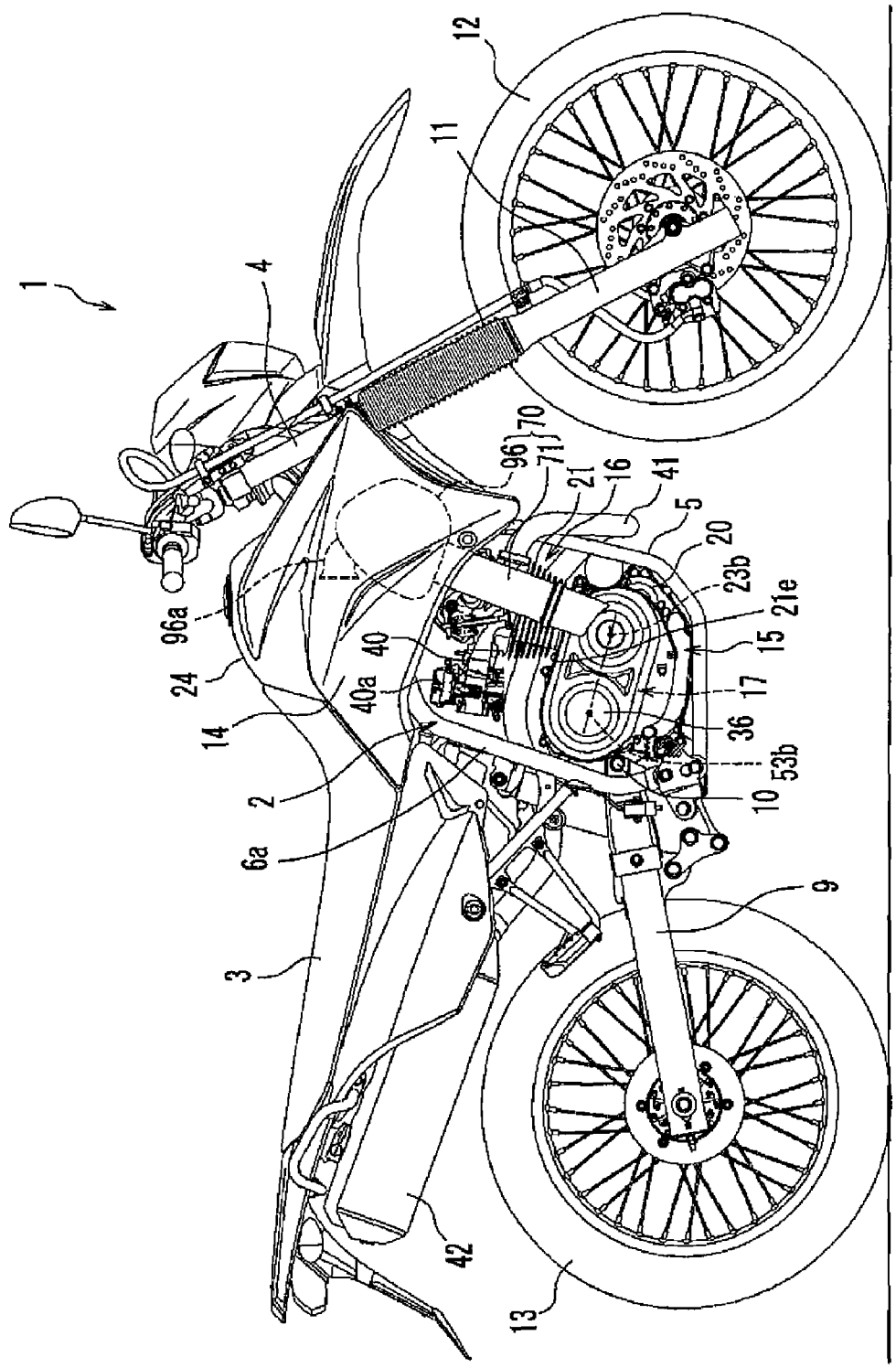
FIG. 9 is a side view of a motorcycle according to a second embodiment of the invention.
Figure 10:
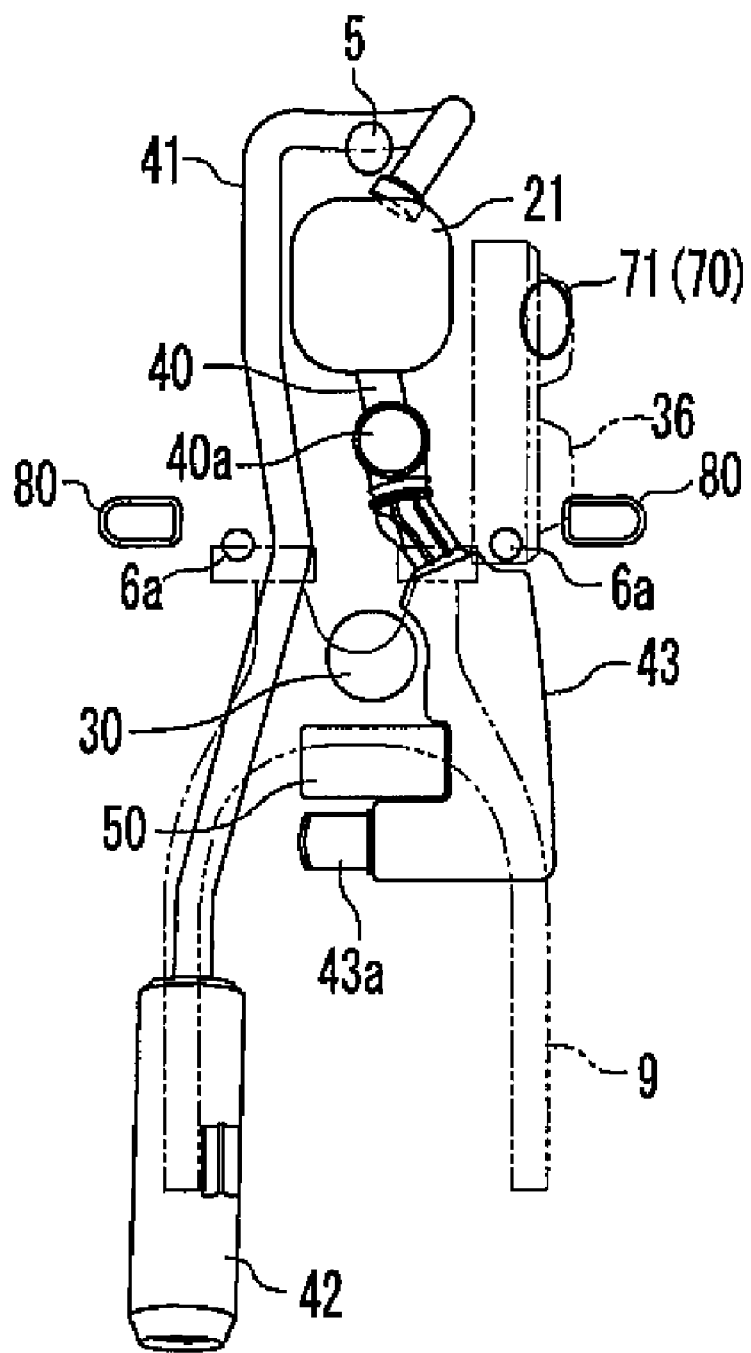
FIG. 10 is a plan view of a part of the motorcycle of FIG. 9.

In a second embodiment of the invention, exhaust pipe 41 of the first embodiment is changed in location, as shown in FIGS. 9 and 10. In the following description, only parts different from the first embodiment are described, and components similar to that of the first embodiment are marked with the same reference signs and numerals.

Exhaust pipe 41 of the second embodiment extends rearward on the left side of cylinder 21. That is, exhaust pipe 41 extends rearward on a side opposite to a side of intake path 70 of cylinder 21.

Air chamber 43 is provided on the right side of rear cushion unit 30 and battery 50, as shown in FIG. 10. In the second embodiment, intake pipe 43a of air chamber 43 opens leftward.

In accordance with the second embodiment, intake duct 71 of intake path 70 is provided on the right side of cylinder 21, exhaust pipe 41 is provided on the left side of cylinder 21 and intake path 70 and exhaust pipe 41 are provided on sides opposite to each other. Accordingly, intake path 70 can extend upward from transmission case 36 without obstruction by exhaust pipe 41, so that a preferable intake path 70 is achieved. Moreover, exhaust pipe 41 does not project in the vehicle width direction even when exhaust pipe 41, cylinder 21 and intake path 70 are in line in the vehicle width direction, since engine 16 is a four cycle type engine and exhaust pipe 41 is thin. This allows intake path 70 to be provided without increasing the size of the vehicle.

<<Other Modifications>>

The invention is not limited to the embodiments described above and can be carried out in other embodiments. Motorcycle 1 has been described as an off-road vehicle suitable for running on bad roads. The off-road vehicle, of course, may also run on paved roads. Further, the motorcycle in accordance with the invention may be a motorcycle of a type equal to an off-road vehicle. For example, the motorcycle may be unsuitable for running on a bad road in practice although it is an off-road type motorcycle in appearance.

In the above embodiments, the whole of intake path 70 extends upward from a part located in front of rear end 21e of cylinder 21. This is only an example, however, and it may be possible that only a part of intake path 70 extends from a part located in front of rear end 21e of cylinder 21. Moreover, while the whole of air box 96 including sucking part 96a has been described as being provided on the inner side of cover 14, it may be possible that a part of air box 96 or sucking part 96a is only provided on the outer side of cover 14.

<<Definition of Terms in Specification>>

As mentioned above, "extending upward" means extending upward as a whole or extending partly upward. It is not limited to extending vertically upward and includes extending obliquely upward. Accordingly, extending obliquely upward to the front side or the like corresponds to "extending upward" in the specification.

Furthermore, "opening rearward" is not limited to opening rearward strictly along a back-and-forth direction. "Opening rearward" includes opening rearward along a direction inclining perpendicularly or laterally to the back-and-forth direction, namely, a case of opening obliquely rearward.

A "cylinder" in the specification includes not only a cylinder body into which a piston is inserted but also a cylinder head.

As described above, the invention is useful for a motorcycle.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
a four cycle engine including a cylinder extending upward from a crank case;
a belt continuously variable transmission provided on one end of the crank case in a vehicle width direction;
a transmission case covering a part of the belt continuously variable transmission and having a belt chamber formed therein for housing the belt continuously variable transmission;
an intake path leading air to the belt chamber, adjacent to the cylinder in the vehicle width direction, and at least a part thereof extending upward from a part of the transmission case in front of a rear end of the cylinder in side view;
a fuel tank;
covers at least partly covering sides of the fuel tank, and widening toward a front side in the vehicle width direction, wherein the intake path has a part provided on inner sides of the covers and includes a sucking part for sucking air in, covered by the covers in a side view; and
an exhaust pipe that is connected to the cylinder and that extends rearward between the cylinder and the intake path, the exhaust pipe configured to cross the intake path above the transmission case when viewed in a side view.

2. The motorcycle according to claim 1, wherein an intake opening that opens rearward is formed in the sucking part.

3. The motorcycle according to claim 1,
wherein the intake path includes an intake duct extending upward from the transmission case and a box-shaped member provided inside the covers, connected to the intake duct and housing an air filter therein.

4. The motorcycle according to claim 1, wherein the intake path is adjacent to the cylinder in the vehicle width direction.

5. The motorcycle according to claim 4, further comprising:
an exhaust pipe connected to the cylinder and extending rearward on a side of the cylinder opposite to a side of the intake path.

6. The motorcycle according to claim 1, wherein:
the belt continuously variable transmission includes a V-belt wound around a primary sheave and a secondary sheave, a primary sheave shaft positioned at a center of rotation of the primary sheave, and a secondary sheave shaft positioned at a center of rotation of the secondary sheave; and
a line connecting an axial core of the primary sheave shaft and an axial core of the secondary sheave shaft crosses substantially at a right angle with a center line of the cylinder in side view.

7. The motorcycle according to claim 1, wherein an intake opening of the intake path faces an inner surface of one of the covers.

8. The motorcycle according to claim 1, wherein an intake opening of the intake path is opened rearward and faces an inner surface of one of the covers.

9. A motorcycle comprising:
a four cycle engine including a cylinder extending upward from a crank case;
a belt continuously variable transmission provided on one end of the crank case in a vehicle width direction;
a transmission case covering a part of the belt continuously variable transmission and having a belt chamber formed therein for housing the belt continuously variable transmission;
an intake path leading air to the belt chamber, adjacent to the cylinder in the vehicle width direction, and extending upward from the transmission case in side view;
an exhaust pipe connected to the cylinder;
a fuel tank; and
covers at least partly covering sides of the fuel tank, and widening toward a front side in the vehicle width direction, wherein the intake path has a part on inner sides of the covers and includes a sucking part for sucking air in, covered by the covers in a side view;
wherein the exhaust pipe extends rearward between the cylinder and the intake path, the exhaust pipe configured to cross the intake path above the transmission case when viewed in a side view.

10. The motorcycle according to claim 9, wherein an intake opening that opens rearward is formed in the sucking part.

11. The motorcycle according to claim 9,
wherein the intake path includes an intake duct extending upward from the transmission case and a box-shaped member provided inside the covers, connected to the intake duct and housing an air filter therein.

12. The motorcycle according to claim 9, wherein the intake path is adjacent to the cylinder in the vehicle width direction.

13. The motorcycle according to claim 12, wherein the exhaust pipe extends rearward between the cylinder and the intake path.

14. The motorcycle according to claim 12, wherein the exhaust pipe extends rearward on a side of the cylinder opposite to a side of the intake path.

15. The motorcycle according to claim 9, wherein the belt continuously variable transmission includes a V-belt wound around a primary sheave and a secondary sheave, a primary sheave shaft positioned at a center of rotation of the primary sheave and a secondary sheave shaft positioned at a center of rotation of the secondary sheave; and a line connecting an axial core of the primary sheave shaft and an axial core of the secondary sheave shaft crosses substantially at a right angle with a center line of the cylinder in side view.

* * * * *